United States Patent
Gao

(10) Patent No.: US 10,992,888 B2
(45) Date of Patent: Apr. 27, 2021

(54) COLOR ELECTRONIC ROLLING SHUTTER IMAGE SENSOR FOR IDENITFYING ITEMS ON FAST MOVING CONVEYOR BELT

(71) Applicant: Datalogic USA, Inc., Eugene, OR (US)

(72) Inventor: WenLiang Gao, Eugene, OR (US)

(73) Assignee: DATALOGIC USA, INC., Eugene, OR (US)

( * ) Notice: Subject to any disclaimer, the term of this patent is extended or adjusted under 35 U.S.C. 154(b) by 197 days.

(21) Appl. No.: 16/249,700

(22) Filed: Jan. 16, 2019

(65) Prior Publication Data

US 2020/0228733 A1    Jul. 16, 2020

(51) Int. Cl.

| | |
|---|---|
| G06K 9/00 | (2006.01) |
| H04N 5/353 | (2011.01) |
| G06K 7/10 | (2006.01) |
| G06K 7/14 | (2006.01) |
| G06K 9/20 | (2006.01) |
| G06K 9/32 | (2006.01) |
| G06T 3/40 | (2006.01) |
| H04N 1/32 | (2006.01) |

(52) U.S. Cl.
CPC ....... *H04N 5/3532* (2013.01); *G06K 7/10722* (2013.01); *G06K 7/1413* (2013.01); *G06K 9/2027* (2013.01); *G06K 9/3216* (2013.01); *G06T 3/4015* (2013.01); *H04N 1/32309* (2013.01); *G06K 2209/01* (2013.01)

(58) Field of Classification Search
CPC .. H04N 5/3532; G06K 9/3216; G06K 9/2027; G06K 7/1413; G06T 3/4015
USPC ......................................... 382/103
See application file for complete search history.

(56) References Cited

U.S. PATENT DOCUMENTS

| | | | |
|---|---|---|---|
| 6,628,445 B2 | 9/2003 | Chaleff et al. | |
| 6,736,321 B2 * | 5/2004 | Tsikos | B82Y 15/00 235/462.01 |
| 6,923,374 B2 * | 8/2005 | Knowles | G02B 26/10 235/454 |
| 6,957,775 B2 * | 10/2005 | Tsikos | G06K 7/10722 235/462.01 |
| 6,959,870 B2 * | 11/2005 | Tsikos | B82Y 15/00 235/462.1 |
| 6,988,660 B2 * | 1/2006 | Tsikos | G06K 9/26 235/454 |

(Continued)

FOREIGN PATENT DOCUMENTS

WO    2016105615 A1    6/2016

OTHER PUBLICATIONS

International Search Report and Written Opinion received for PCT Patent Application No. PCT/US2020/012764, dated Jun. 25, 2020, 14 pages.

*Primary Examiner* — Marceau Milord
(74) *Attorney, Agent, or Firm* — Shook, Hardy & Bacon, L.L.P.

(57) ABSTRACT

An image capture system has an electronic rolling shutter (ERS) imager in area mode with high illumination to perform image acquisition (i.e. barcode reading) for fast moving items. Shearing distortion may occur but image blur is reduced and the image can be decoded. The ERS imager replaces global shutter imagers at a much lower cost and wider availability. The image capture system separates illumination into multiple bands in space and then synchronize the illumination bands with the exposure of the ERS imager in time. Much less illumination is required for the same image quality.

20 Claims, 7 Drawing Sheets

(56) References Cited

U.S. PATENT DOCUMENTS

| | | | | |
|---|---|---|---|---|
| 7,070,106 B2* | 7/2006 | Knowles | G02B 27/095 | 235/462.14 |
| 8,657,196 B2* | 2/2014 | Olmstead | G07G 1/0045 | 235/462.01 |
| 8,800,874 B2* | 8/2014 | Gao | G06K 7/10841 | 235/469 |
| 9,141,842 B2* | 9/2015 | Gao | G06K 7/10861 | |
| 9,544,518 B2* | 1/2017 | Awatani | H04N 9/04557 | |
| 10,248,896 B2* | 4/2019 | Gao | G06F 13/4282 | |
| 10,262,176 B1* | 4/2019 | Powell | G06K 7/1413 | |
| 10,768,497 B2* | 9/2020 | Herloski | G02F 1/137 | |
| 2002/0139853 A1* | 10/2002 | Tsikos | B82Y 15/00 | 235/462.01 |
| 2002/0145042 A1* | 10/2002 | Knowles | B82Y 15/00 | 235/462.01 |
| 2002/0153422 A1* | 10/2002 | Tsikos | G06K 7/10742 | 235/454 |
| 2002/0195496 A1* | 12/2002 | Tsikos | G02B 19/009 | 235/462.01 |
| 2003/0019931 A1* | 1/2003 | Tsikos | H01S 5/4025 | 235/454 |
| 2003/0052169 A1* | 3/2003 | Tsikos | G06K 9/26 | 235/454 |
| 2012/0187191 A1* | 7/2012 | Olmstead | G06K 7/10732 | 235/462.13 |
| 2013/0206839 A1* | 8/2013 | Gao | G06K 7/10861 | 235/462.42 |
| 2016/0022389 A1* | 1/2016 | Esbech | G01J 3/508 | 250/208.1 |
| 2017/0272629 A1 | 9/2017 | Kobuse | | |
| 2018/0092515 A1* | 4/2018 | Yashiro | A61B 1/00181 | |
| 2019/0287226 A1* | 9/2019 | Holub | G06K 7/1443 | |

* cited by examiner

COLOR ELECTRONIC ROLLING SHUTTER IMAGE SENSOR FOR IDENITFYING ITEMS ON FAST MOVING CONVEYOR BELT

CROSS-REFERENCE TO RELATED APPLICATIONS

None.

BACKGROUND

Conventional scanners process items by reading and decoding information affixed to the items as they move along a conveyor system. Typically, the scanners incorporate a light source and a light detecting means, such as charge-coupled device (CCD) sensors or complementary metal-oxide-semiconductor (CMOS) sensors. A portion of the light which is reflected from the item is detected by the image sensor and converted into an electrical signal, which is the basis for the object properties that include digital images of the item that has been read by the scanner. The digital image is processed and decoded according to instructions executed by computer processors of the conventional scanners or the conveyor system.

A high pixel count monochrome global shutter image sensor is usually required for industrial applications such as for reading a barcode (watermark or optical characters) on a surface of items that are fast moving on a conveyer belt. For example, in Transportation and Logistics (T&L) or postal applications, a typical conveyer belt can be as wide as twenty-four (24) inches (609.6 mm) and move as fast as 2000 mm/second. Storing images that move along the conveyor belt is desired for visual check and backup.

To satisfy the requirements above, an expensive high pixel count monochrome global shutter area or linear imagers are used, such as nine (9) megapixels, twelve (12) megapixels, or even higher. These type of imagers are very expensive. Alternatively, very high pixel count color Electronic Rolling Shutter (ERS) image sensors are commercially available mainly for smart phone applications. The main problems with using an imager is 1) decoding barcodes, watermarks (e.g. Digimarc watermarks from DIGIMARC Corporation of Beaverton, Oreg.), optical character recognition (OCR) (such as Scale Invariant Feature Transform (SIFT) or other optical feature recognition methods) with Red, Green, and Blue (RGB) Bayer pattern; and 2) image blur caused by fast moving items. The Bayer pattern is a color filter array, for arranging RGB color filters on a grid of photosensors. Long exposure times can contribute to image blur of fast moving items. Short exposure time is desired, such as less than 100 microseconds with very high-illumination optical power, and very large-duty cycle for high pixel count ERS CMOS sensors.

A solution is needed that allows use of an inexpensive very high pixel count image sensor, such as a color ERS CMOS image sensor, for identifying items on moving belt applications.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the invention provide illumination bands that are oriented along an item's motion and selectively activated in conjunction with an exposure of an associated image sensor band from image sensor bands in a sensor.

The issue of decoding (for non-single color of red, green or blue labels) and image blur can be solved by 1) de-mosaic of the RGB images, where usually the label and pixels are not perfectly aligned; and 2) short exposure and a strong band-activated illumination, so that instead of image blur, only slanted distortion that is perpendicular to the moving direction is observed. This distortion does not affect decoding of barcode labels, watermarks, and optical character recognition.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1A:
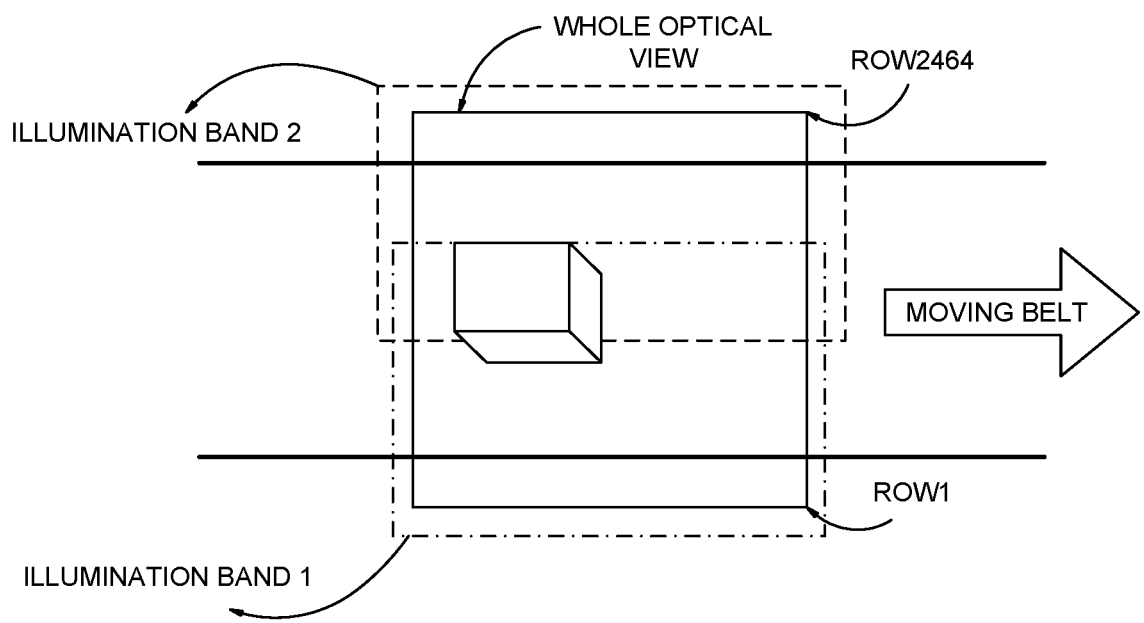
FIG. 1a is an illustration of a top view of barcode reading of an item moving across a conveyor belt, implemented in accordance with an embodiment of the present invention.

The subject matter of aspects of the present invention is described with specificity herein to meet statutory requirements. However, the description itself is not intended to limit the scope of this patent.

Embodiments of the invention described herein provide a method for identifying items on a fast conveyor belt with a low-cost image capturing system that includes operating an imager above or below the fast conveyor belt. The low-cost image capturing system captures an image of an area from one side of the fast conveyor belt to the other side of the fast conveyor belt. The image of the area is perpendicular to a movement of the conveyor belt. A high-powered illuminator illuminates multiple bands of illumination. Each band is illuminated and synchronized with an image exposure from the imager such that the multiple bands are illuminated individually and sequentially over a time period. As an item moves along the fast conveyor belt, the image exposure of a portion of the item occurs with each band of illumination. A composite of the image exposures results in a similar image of the item. An image blur is reduced from a use of high-powered illumination with sequenced multiple bands and a short exposure time. The timing of the illumination band activation is decided by the imager exposure control in the image capturing system and the item's dimension (e.g. length, width, and height), which are identified properties from the available dimensioning subsystem.

In another embodiment, a method for identifying items on a fast conveyor belt with an image capturing system is provided that includes operating the image capturing system over the fast conveyor belt to capture images of an item that moves along the fast conveyor belt. Multiple image captures are synchronized from multiple sensor bands with multiple light emitting diode (LED) bands. The multiple LED bands are sequenced to the multiple sensor bands. The multiple image captures result in a composite image of the item. Red raw pixels (R plane) of the composite image are localized, wherein a barcode, watermark, or optical character recognition feature is found. The composite image is put through a demosaicing process to obtain the red, green, and blue colors of pixels. A luminance (Y) of the YUV is derived from the RGB colors. Shear distortion is corrected based on a speed of the fast conveyor belt. The label is decoded, wherein the label is a barcode, watermark, or optical character recognition. The results of the decoded label are sent from the image capturing system.

In yet another embodiment, an imaging system for capturing indicia that moves on a conveyor belt is provided that includes a sensor and an illuminator. The sensor is in area mode and captures the indicia. The sensor is divided into multiple sensor bands where each sensor band scans multiple lines. The multiple sensor bands are sequentially exposed. The illuminator is divided into multiple illumination bands. Each illumination band is focused on an illumination of a distinct field of view captured by each sensor band. The multiple illumination bands are sequentially illuminated when the multiple sensor bands are sequentially exposed. The multiple illumination bands of the sensor are oriented in a direction towards the conveyor belt to scan the indicia. Starting with a first sensor band of the sensor and a first illumination band of the illuminator, a first portion of the indicia is illuminated and exposed, and then the remaining sensor bands and remaining illumination bands illuminate and expose the remaining portions of the indicia in sequence. When each illumination band is illuminated, the remaining illumination bands are turned off.

As shown in FIG. 1a, a high pixel count RGB ERS imager (not shown) covers a whole scan volume of a top surface in a top view 100a. Although the RGB ERS imager is used to illustrate the embodiment, other types of imagers can be used, including a monochrome ERS imager. An ERS imager is used because it has an electronic rolling shutter and the image is scanned sequentially, from one side of the conveyor belt to the other side. In contrast, the global shutter imager can capture an entire area of the image. The global shutter imager captures the entire area of the image at a much higher cost with the same pixel count as the ERS imager (sensor). The ERS imager is used in area mode (not line scan mode) to view the entire conveyor belt. This means that multiple sensor bands in the sensor of the ERS imager can scan small area bands in sequence.

Continuing with FIG. 1a, multiple bands of high-powered illumination are provided with illumination bands 115 and 120 shown. Likewise, multiple sensor bands of the sensor in the RGB ERS imager are provided. The multiple sensor bands are represented by rows from 1 to 2464. In other embodiments, different numbers of illumination bands and sensor bands can be implemented.

With multiple bands of high-powered illumination, image exposures of the sensor bands are synchronized to the illumination of the illumination bands. This synchronization can be a one-to-one correlation between one sensor band to one illumination band. Or, the synchronization can be a correlation of several sensor bands providing exposure in sequence to one illumination band. The number of sensor bands that provide exposure to one illumination band can vary according to the implementation and according to the speed of the conveyor belt. As one can see in FIG. 1a, several sensor bands provide sequential image exposure with illumination band 115 while other sensor bands provide sequential image exposure with illumination band 120. The image exposure sequences and illuminations occur while conveyer belt 125 is moving at a fast rate, such as 2000 millimeters per second.

Figure 1B:
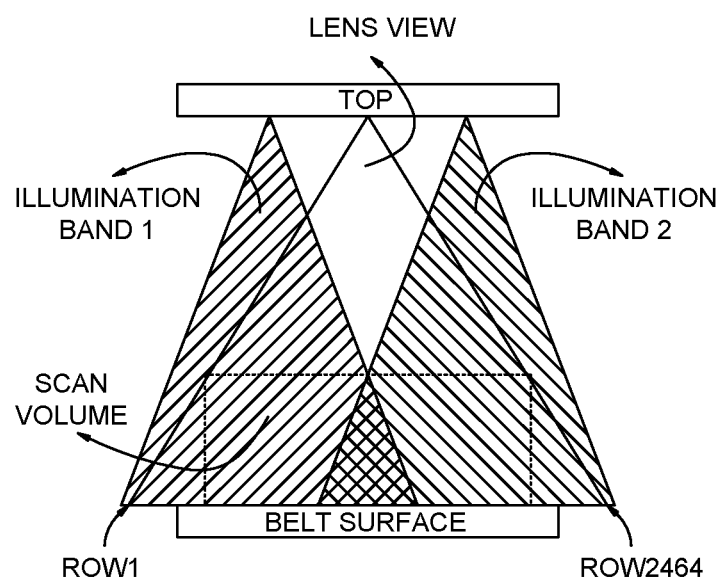
FIG. 1b is an illustration of a side view of FIG. 1 showing the field of view of the illumination bands over the conveyor belt, implemented in accordance with an embodiment of the present invention.

In FIG. 1b, the RGB ERS imager is positioned above conveyor belt 125 and includes lens view 130. The imager captures the image of the entire belt 125 (including item 135) from one side of the belt to the other side. When item 135 is moving, the captured image has a motion distortion, which is called image shear in motion direction, as shown in FIG. 5b. However, this motion distortion (image shear) does not affect the ability to decode the captured image. For SIFT feature recognition, one-dimensional and two-dimensional barcodes and some watermarks are decodable without shear distortion correction.

In other embodiments, the ERS imager can be located in positions other than above or below the conveyor belt. Although not shown, the ERS imager can be placed to the side of the conveyor belt, can be turned at an angle, or can be placed at an offset to the conveyor belt rather than be located directly overhead the conveyor belt. Additionally, the ERS imager can be implemented as a stand-alone device or can be implemented as multiple units located in different positions. The multiple units of an ERS imaging system could scan or image different sides of the conveyor belt.

The overall goal is to note that embodiments can be implemented in terms of an imager or camera scanning items on a conveyer belt where the imager or camera is positioned at a top or overhead position, is positioned at a bottom position, is positioned laterally or at the side of the conveyor belt, is positioned overhead and frontally (with respect to the item being scanned), or is positioned overhead and at the back (with respect to the item being scanned). These various positions of the imager allow for the scanning of items (i.e. barcodes, watermarks, OCR) that may not be perfectly positioned perpendicular to the optical axis of the imager, such as being directly above the item being scanned.

Figure 2A:
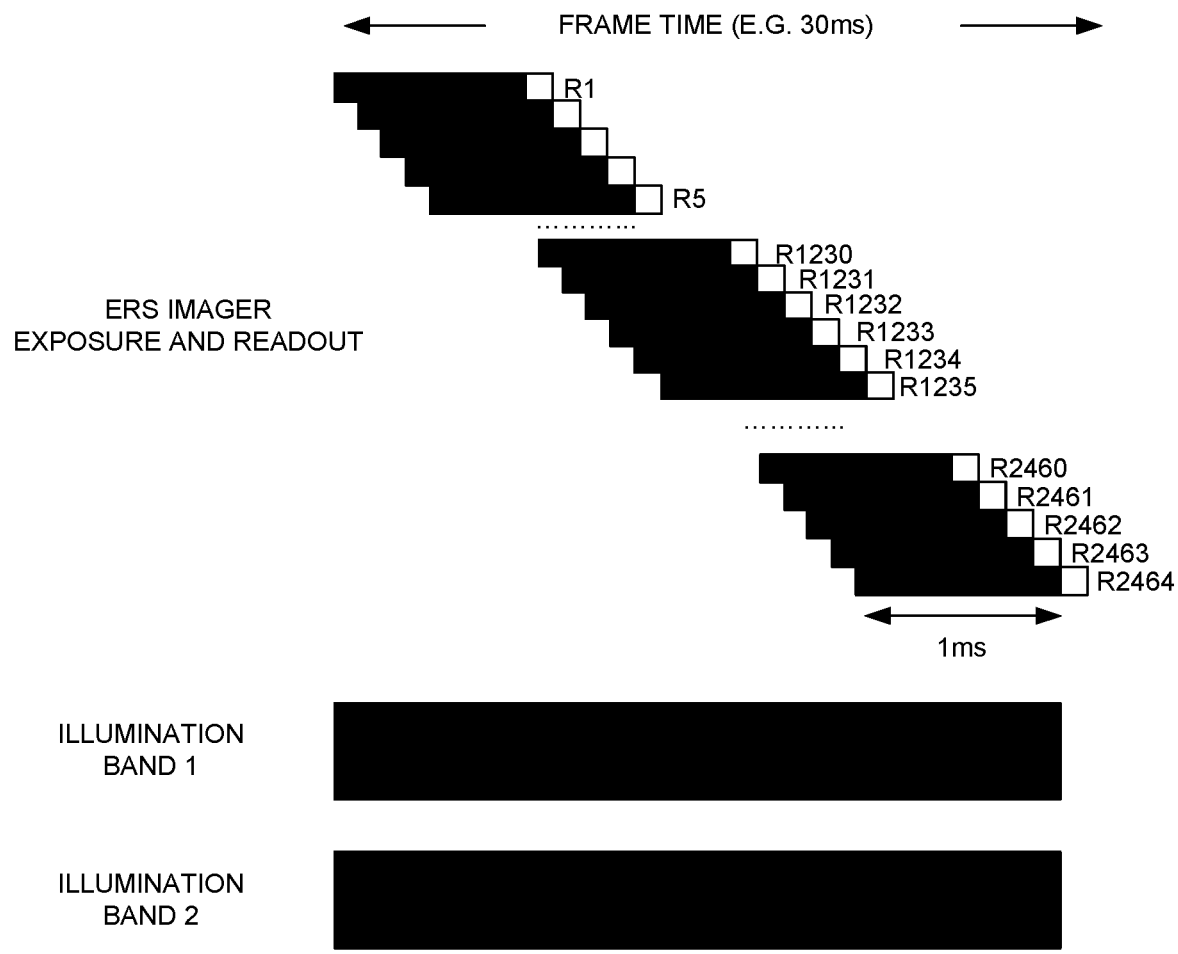
FIG. 2a is an illustration of a sequence of exposures of multiple sensor bands in an image capture sequence of an imager lined up with simultaneous illumination of multiple illumination bands.
Figure 2B:
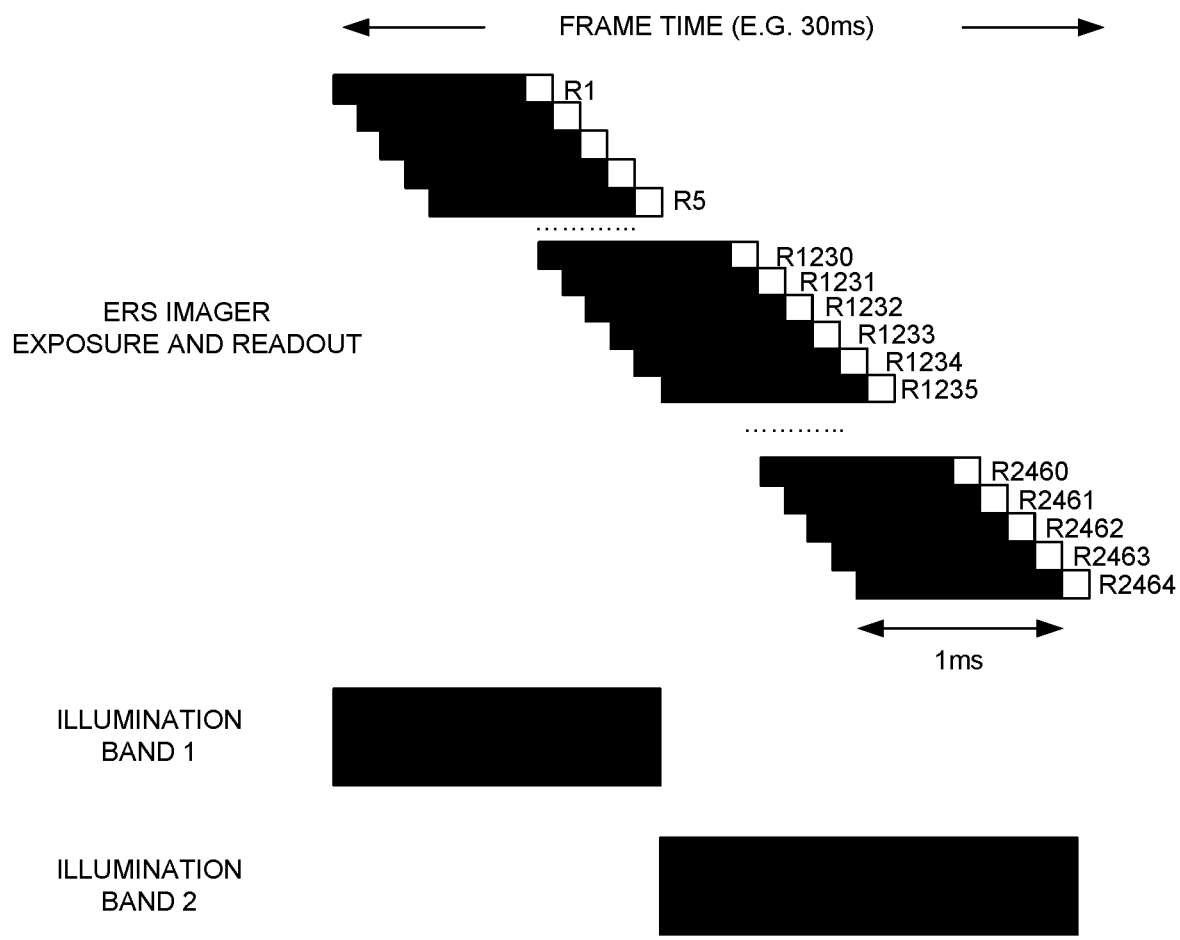
FIG. 2b is an illustration of a view of FIG. 2a where each illumination band illuminates individually in sequence, implemented in accordance with an embodiment of the present invention.

FIGS. 2a and 2b illustrate the combination of multiple sensor bands and multiple illumination bands in image capture systems 200a and 200b. In FIG. 2a, image capture system 2a includes multiple sensor bands 205a where each band is an image exposure of one (1) millisecond duration. Each sensor band of multiple sensor bands 205a is indicative of an image capture from the ERS imager. The results of the image capture are shown in multiple sensor bands 205a with the sequential staggered exposures. At the same time, multiple illumination bands 210a are shown where illumination occurs from all bands during the sequential staggered exposure of each sensor band. While the high-powered illumination allows for item 133 to be captured, an even more efficient and improvement can be made. In FIG. 2b, image capture system 2b includes multiple sensor bands 205a, which are the same as found in FIG. 2a. However, FIG. 2b is an improvement over FIG. 2a because multiple illumination bands 210b are sequenced so that only one illumination band is turned on at a time. The results are that during the sequencing of the image capture with the sensor bands, the illumination bands are synchronized and sequenced to provide high-powered illumination at each illumination band over the same time period as the sequenced image capture of the sensor bands.

FIG. 2a shows an implementation of an embodiment of the present invention, but FIG. 2b shows a further improvement of the present invention through illumination efficiency. Illumination bands 210b illustrate that the system only turns on LEDs illuminating the area where the actual image capture is occurring. As one can see, an individual illumination band can illuminate an area covered by several sensor bands. In other words, the illumination design can be separated into multiple illumination bands, such as 2, 4, 6, 8, or higher. However, when the number of illumination bands is higher, the alignment of illumination is difficult. On the contrary, six (6) bands that span over a 24-inch conveyor belt would not need any alignment.

The benefits of the invention as shown in FIGS. 2a and 2b are a low-cost ERS imager. This type of imager uses less energy and reduces heat. Because the imager only turns on one illumination band at a time, this reduces the amount of energy used by the imager, since all illumination bands are not turned on at once wasting energy. At the same time, the imagers give off less heat because only one illumination band is turned on at any given point in time as opposed to all illumination bands being turned on. Likewise, the imager is a lower cost product in comparison to other imagers that not capable of providing sequenced image exposures with sensor bands along with synchronized illumination bands.

Figure 3:
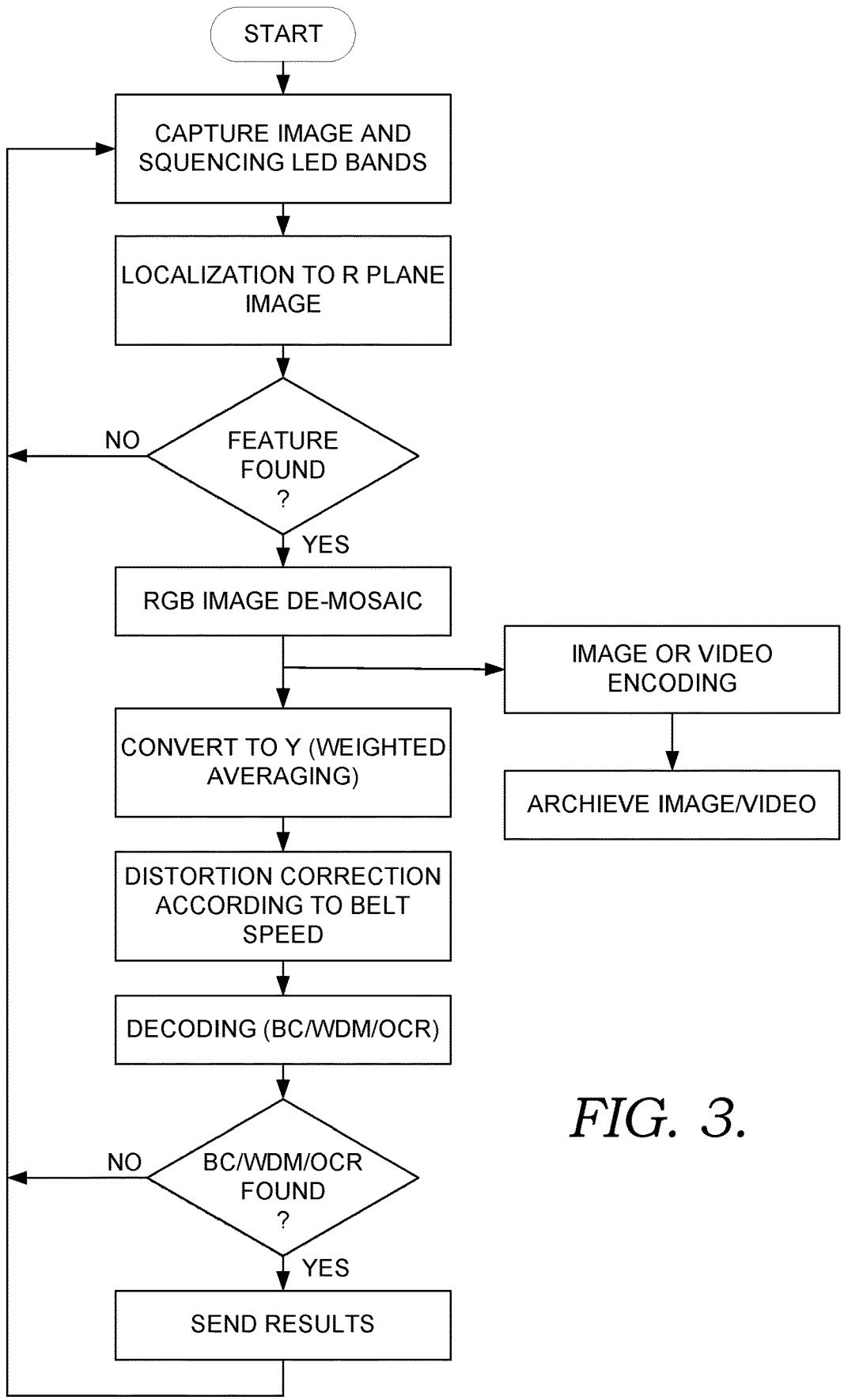
FIG. 3 is a process for decoding an image of an ERS imager, implemented in accordance with an embodiment of the present invention.

Turning now to FIG. 3, a process 300 is shown for decoding an image of an ERS imager. In a step 305, the ERS imager captures an image with sensor bands while sequencing with LED illumination bands. In a step 310, there is a localization to the R plane of the image. In other words, there is a barcode localization for red raw pixels only. Localization means that an attempt is made to find the barcode feature only before decoding the whole label in the image, such as Start, Stop, central guard, etc. Then, a determination is made if the feature is found, as shown in a step 315. If no feature is found, no additional processing is performed, saving processing resources and time, which makes the frame rate fast. As such, process 300 can begin again at step 305.

If the barcode feature is found, then in a step 320, processing continues with a demosaic of the RGB image. The image is encoded in a step 325 and then archived in a step 330. In a step 335, the luminance (Y) of YUV is derived from the RGB color by taking a weighted average of the red, green, and blue components. RGB is a common way to represent colors. However, other coordinate systems are possible. The term YUV refers to a family of color spaces, all of which encode brightness information separately from color information. Like RGB, YUV uses three values to represent any color.

In a step 340, distortion or shear distortion of the image is corrected according to the conveyor belt speed. The system can decode the image despite distortion in a step 345. If the label (barcode, watermark, or optical character recognition) can be decoded (step 350), the results are sent, in a step 355.

During the processing of color images, a process of demosaicing is used as one part of the process. Demosaicing is an algorithm that is a digital image process used to reconstruct a full color image from the incomplete color samples output from an image sensor overlaid with a color filter array (CFA). It is also known as CFA interpolation or color reconstruction. A CFA is a mosaic of color filters usually in front of the image sensor. Commercially, the most commonly used CFA configuration is the Bayer filter. It has alternating red (R) and green (G) filters for odd rows and alternating green (G) and blue (B) filters for even rows. To create a full-color image, still cameras and video cameras use demosaic algorithms to determine red, green, and blue luminance information for each pixel location.

Figure 4:
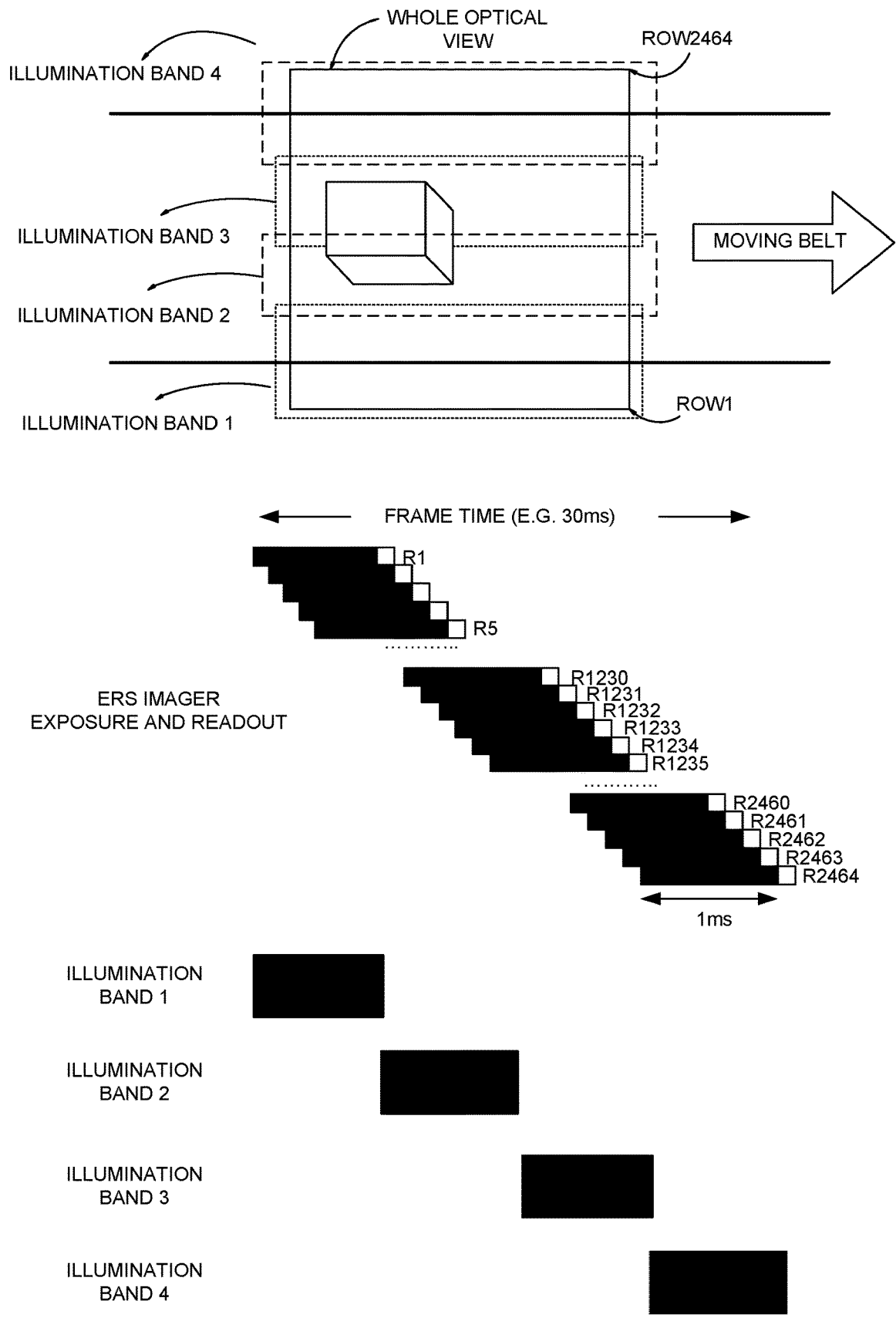
FIG. 4 is a composite view of FIGS. 1a and 2b using four-band illumination for better illumination efficiency, implemented in accordance with an embodiment of the present invention.

Turning now to FIG. 4a, a composite view 400 of FIGS. 1a and 2b are shown implemented with four (4) bands of illumination. As in FIG. 1a, a high pixel count RGB ERS imager (not shown) covers a whole scan volume of a top surface in a top view 401. Multiple bands of high-powered illumination are provided with illumination bands 403, 404, 405, and 406 shown. Likewise, multiple sensor bands 410 of the sensor in the RGB ERS imager are provided. Multiple sensor bands 410 are represented by rows from 1 to 2464. With four (4) bands of high-powered illumination, image exposures of the sensor bands 410 are synchronized to the illumination of illumination bands 403, 404, 405, and 406. This synchronization is a correlation of several sensor bands providing exposure in sequence to one illumination band. The number of sensor bands that provide exposure to one illumination band varies according to the implementation (e.g. size of the frame and duration of the exposure) and according to the speed of the conveyor belt. As one can see in FIG. 4, several sensor bands provide sequential image exposure with each of illumination bands 403, 404, 405, and 406. The image exposure sequences and illuminations occur while conveyer belt 407 is moving with item 408.

In an implementation of embodiment of the invention, four-band illumination as shown in FIG. 4 provide better illumination efficiency than with less illumination bands. For example, an illumination efficiency can be calculated with an exemplary frame time of thirty (30) milliseconds, image exposure time of one (1) millisecond and four (4) high-powered LED illumination bands. The efficiency will be 1 ms/30 ms*4=13%. Therefore, in this example, the efficiency is thirteen percent. Likewise, if six (6) illumination bands are implemented with the same frame time and image exposure duration per sensor band, the efficiency will be twenty percent (20%).

Figure 5A:
FIG. 5a is an exemplary illustration of labels or barcodes that are scanned in accordance with an embodiment of the present invention.
Figure 5B:
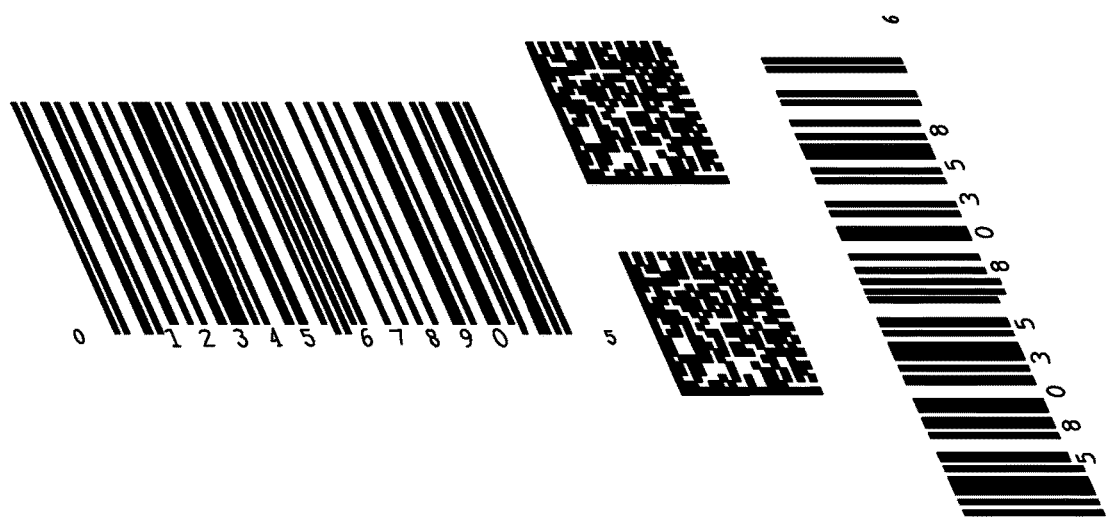
FIG. 5b is an exemplary illustration of labels or barcodes in FIG. 5 that are scanned while moving on a fast-moving conveyor belt and encountering shear distortion from the imaging process in accordance with an embodiment of the present invention.

In FIG. 5a, labels 500a are shown as they actually exist on a top surface. Labels 500a can be barcodes, digital watermarks, optical character recognition, or other similar items. In FIG. 5b, labels 500b are shown as the results of image shear distortion caused by an ERS imager capturing labels 500a during motion on a conveyor belt. The image capture is from the first row on the top to the last row on the bottom. As one can see, there is almost no image blur because high illumination was used.

Figure 6:
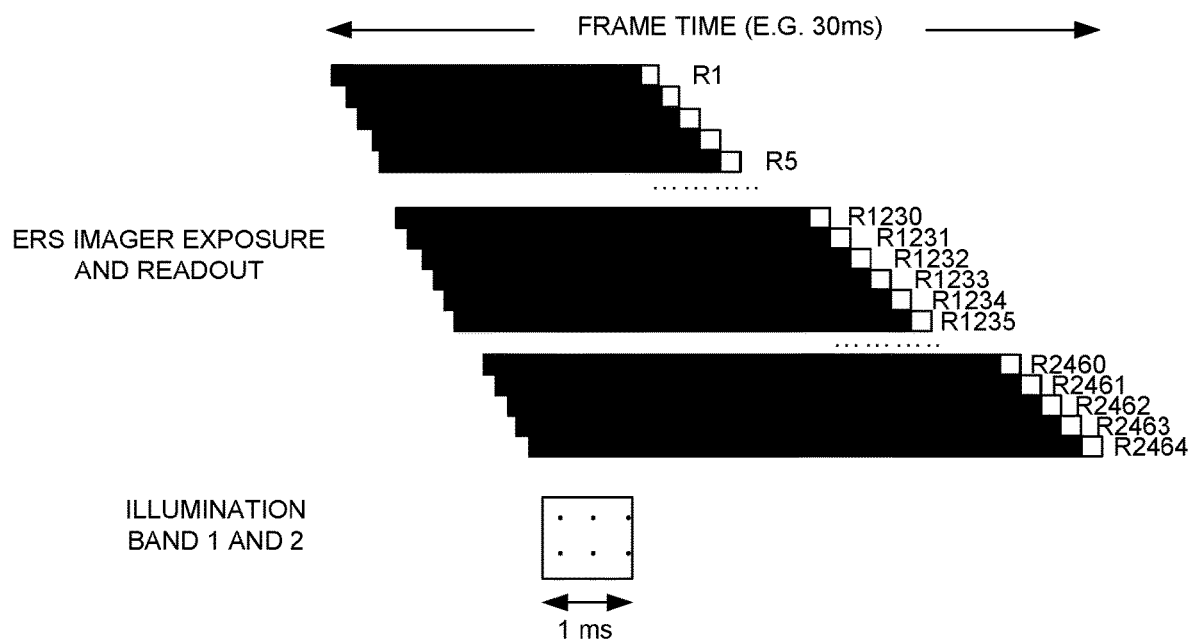
FIG. 6 is an illustration of a sequence of exposures of multiple sensor bands in an image capture sequence of an ERS imager using pulse light under low ambient light condition where illumination without bands can be used.

Turning now to FIG. 6, a sequence 600 of image exposures of multiple sensor bands in an image capture sequence of an ERS imager is shown using pulse light under low ambient light conditions where illumination without bands can be used. Both bands 1 and 2 are activated simultaneously and the illumination pulse width is much shorter than the exposure time or frame time. This type of synchronized exposure and illumination works when the ambient light is low (i.e. dark).

One thing to note, the reason for providing very high illumination in each illumination band is to reduce the amount of image exposure time from each sensor band, which in turn reduces image blur.

Many different arrangements of the various components depicted, as well as components not shown, are possible without departing from the spirit and scope of embodiments of the present invention. Embodiments of the present invention have been described with the intent to be illustrative rather than restrictive. Certain features and sub-combinations are of utility and may be employed without reference to other features and sub-combinations and are contemplated to be within the scope of the claims.

What is claimed is:

1. A method for identifying items on a conveyor belt with an Electronic Rolling Shutter (ERS) image capturing system, comprising:
    operating an imager in the ERS image capturing system in proximity to the conveyor belt, wherein the imager captures an image of an item on an object that travels on the conveyor belt;
    operating a high-powered illuminator that illuminates multiple bands of illumination, wherein each band is illuminated and synchronized with an image exposure from the imager such that the multiple bands are illuminated individually and sequentially over a time period; and
    as the object moves along the conveyor belt, performing the image exposure of a portion of the item with each band of illumination, wherein a composite of the image exposures results in a similar image of the item, wherein an image blur is reduced from a use of the high-powered illumination with sequenced multiple bands.

2. The method of claim 1, wherein operating the imager in the ERS image capturing system in proximity to the conveyor belt comprises operating the imager in the ERS image capturing system in a position at least one of above the conveyor belt, below the conveyor belt, to a side of the conveyor belt, or at an angle to the conveyor belt.

3. The method of claim 2, further comprising identifying a speed of the conveyor belt to adjust image exposure and band illumination sequence; and adjusting image exposure and band illumination of the item to reduce shear distortion.

4. The method of claim 2, further comprising adjusting a width of the band illumination to reduce remaining image blur.

5. The method of claim 1, wherein operating the imager in the ERS image capturing system comprises operating multiple units of the imager (in the ERS image capturing system) located in different positions relative to the conveyor belt.

6. The method of claim 1, wherein the imager is an electronic rolling shutter (ERS) imager.

7. The method of claim 6, wherein the high-powered illuminator is a light emitting diode (LED) illuminator.

8. The method of claim 7, wherein the item is located on a surface of the object.

9. A method for identifying items on a conveyor belt with an image capturing system, comprising:
    operating the image capturing system to capture images of a label that moves along the conveyor belt;
    synchronizing multiple image captures from multiple sensor bands with multiple light emitting diode (LED) bands, wherein the multiple LED bands are sequenced to the multiple sensor bands, and wherein the multiple image captures result in a composite image of the label;
    localizing to the red raw pixels (R plane) of the composite image, wherein localizing comprises finding a barcode, watermark, or optical character recognition feature;
    demosaicing the composite image to obtain the red, green, and blue (RGB) colors of pixels;
    deriving a luminance (Y) of the YUV from the RGB colors;
    correcting a shear distortion based on a speed of the conveyor belt;
    decoding the label, wherein the label is a group consisting of barcodes, watermarks, and optical character recognitions; and
    sending the results of the decoded label from the image capturing system.

10. The method of claim 9, wherein the multiple sensor bands are part of a sensor in the image capturing system.

11. The method of claim 10, wherein the multiple LED bands are part of an illuminator in the image capturing system.

12. The method of claim 11, wherein operating the image capturing system comprises operating the image capturing system at least one of over the conveyor belt, below the conveyor belt, to a side of the conveyor belt, or at an angle to the conveyor belt.

13. An imaging system for capturing indicia that moves on a conveyor belt, comprising:
    a sensor in area mode configured to capture the indicia, wherein the sensor is divided into multiple sensor bands, each sensor band is configured to scan multiple lines;
    the multiple sensor bands are sequentially exposed;
    an illuminator is divided into multiple illumination bands, wherein each illumination band is configured to focus on an illumination of a distinct field of view captured by each sensor band;
    the multiple illumination bands are configured to sequentially illuminate when the multiple sensor bands are sequentially exposed such that the multiple illumination bands are synchronized with the multiple sensor bands;
    the multiple illumination bands of the sensor are oriented in a direction towards the conveyor belt to scan the indicia; and
    a first sensor band of the sensor and a first illumination band of the illuminator are configured to illuminate and expose a first portion of the indicia, and then the remaining sensor bands and remaining illumination bands are configured to illuminate and expose the remaining portions of the indicia in sequence, wherein when each illumination band is illuminated, the remaining illumination bands are turned off.

14. The imaging system of claim 13, further comprising the imaging system configured to use a speed of the conveyor belt to adjust image exposure in the multiple sensor bands and illumination in the multiple illumination bands to reduce shear distortion in the indicia.

15. The imaging system of claim 14, further comprising the imaging system configured to adjust a width of each illumination band to reduce image blur.

16. The imaging system of claim 15, wherein the imaging system comprise an electronic rolling shutter (ERS) imager.

17. The imaging system of claim 16, wherein the illumination bands are high-powered and configured to emit bright light.

18. The imaging system of claim 17, wherein the illumination bands are light emitting diode (LED) illuminators.

19. The imaging system of claim 18, wherein the sensor is located at least one of above the conveyor belt, below the conveyor belt, to a side of the conveyor belt, or at an angle to the conveyor belt.

20. The imaging system of claim 16, wherein the indicia is located on a surface of a package or an item that is moving on the conveyor belt.

* * * * *